United States Patent [19]

Meunier

[11] Patent Number: 5,221,572
[45] Date of Patent: Jun. 22, 1993

[54] STRETCHABLE PROTECTIVE FABRIC AND PROTECTIVE APPAREL MADE THEREFROM

[75] Inventor: Pierre P. Meunier, Kanata, Canada

[73] Assignee: Her Majesty the Queen in right of Canada, as represented by the Minister of National Defence, Ottawa, Canada

[21] Appl. No.: 753,936

[22] Filed: Sep. 3, 1991

[30] Foreign Application Priority Data

Oct. 17, 1990 [CA] Canada .................................. 2027850

[51] Int. Cl.⁵ .............................................. C08L 29/00
[52] U.S. Cl. .................... 428/231; 428/244; 428/265; 428/290; 428/302; 427/257
[58] Field of Search .............. 428/244, 231, 265; 427/257

[56] References Cited

U.S. PATENT DOCUMENTS

| 4,454,191 | 6/1984 | von Blücher et al. | 428/244 |
| 4,459,332 | 7/1984 | Giglia | 428/86 |
| 4,923,741 | 5/1990 | Kosmo et al. | 428/252 |
| 4,981,738 | 1/1991 | Farnworth et al. | 428/55 |

Primary Examiner—George F. Lesmes
Assistant Examiner—Chris Raimund
Attorney, Agent, or Firm—Nixon & Vanderhye

[57] ABSTRACT

A protective fabric suitable for use in hazardous environments such as those in which nuclear, chemical and biological warfare agents or similar hazardous elements exist. In general, the protective fabric comprises a plurality of layers of air- and water-vapor-permeable, thin, stretchable fabric materials, each being treated to provide separate or combined protective functions. The protective fabric may be fashioned into articles of protective apparel suitable for applications where close-fitting and conforming garments are required and where heat-stress and bulk of material is of concern.

7 Claims, 1 Drawing Sheet

STRETCHABLE PROTECTIVE FABRIC AND PROTECTIVE APPAREL MADE THEREFROM

FIELD OF THE INVENTION

The present invention relates to protective fabrics for use in hazardous environments and to protective apparel manufactured from such fabrics.

BACKGROUND

In hazardous environments such as those where toxic chemicals or vapours exist or where nuclear, biological and chemical (NBC) warfare agents are present or may be impending, personnel must wear protective clothing in addition to, or integral with, their regular clothing and equipment in order to protect themselves from these perilous elements. For personnel such as aircrew, who require helmets or other headgear, such protective clothing must not impair the intended functions of the headgear. For instance, the helmet that is worn by aircrew has several functions that must be maintained, even during NBC operations. These functions include protection of the head in the event of a crash, protection of the ear against excessive aircraft noise, and provision of means for electronic communications, to name a few. In most instances, the headgear or helmet is very tight fitting and the smallest protrusion or pressure point can cause considerable discomfort after only a few minutes of wear. If a protective hood is to be worn under the headgear, then it must not cause discomfort to the wearer and must maintain the functions of the headgear (i.e. hearing protection and communications intelligibility) to a specified level.

There are only a few under-the-helmet NBC respirators intended for aircrew use, each of which utilizes impermeable rubber or other rubberized materials. Impermeable rubberized materials are not always suitable for use in an NBC protection system as they create heat stress which is a major concern in the design of modern NBC equipment. The current breathable NBC garments are thick and bulky, and are generally only acceptable because nothing else is available.

SUMMARY OF THE INVENTION

The present invention overcomes the aforementioned problems by providing an air- and water-vapour-permeable, thin and stretchable protective fabric which may be fashioned into protective garments. In general, the protective fabric comprises a plurality of thin, air- and water-vapour-permeable, stretchable fabric materials, each of which is treated to provide separate or combined protective functions. In addition to the protective nature of the fabric or the clothing made therefrom, other properties include: it is stretchable so as to fit snugly and comfortably on the intended body part; it is sufficiently thin so as to be uncumbersome and to not interfere with equipment or additional apparel that must be donned; and it is air- and water-vapour-permeable so as to allow the material to "breathe", which results in a reduction in the heat stress normally associated with conventional protective clothing.

In one embodiment, the protective fabric comprises two layers of thin, air- and water-vapour-permeable, stretchable materials. The first layer is treated to repel liquid chemical warfare agents and the second layer is impregnated with charcoal to provide chemical vapour protection. The resultant fabric material may be fashioned appropriately into protective apparel which fits snugly and comfortably on the wearer, and which does not interfere with the intended functions of additional clothing and/or equipment. The material also provides for a reduction in the heat stress and/or a reduction in the bulkiness normally associated with current protective garments. When made into a protective hood, the hood stretches to fit snugly over the wearer's head so as not to cause pressure points or discomfort when a helmet or other headgear is worn thereover and allows the helmet's earcups to effect a seal around the ear for improved hearing protection and communications intelligibility.

DESCRIPTION OF THE PREFERRED EMBODIMENT

Figure 1:
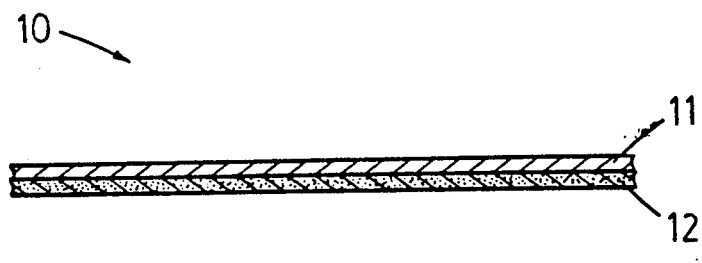
FIG. 1 is a cross-sectional view of one embodiment the material of the present invention.

The preferred embodiment of the present invention is illustrated in cross-section in FIG. 1 and is denoted generally at 10. The protective material 10 comprises a first layer 11 and a second layer 12 of thin, air- and water-vapour-permeable, stretchable fabric materials, each of which are treated to provide one or more protective functions. The first layer 11 is composed of a fabric material, such as spandex, having sufficient elasticity and conformity to effect a snug and comfortable fit on the wearer and it is treated to repel liquid chemical warfare agents. The first layer 11 is given a durable fluorocarbon, oil-resistant and water-repellant treatment which provides the liquid chemical protection. The fabric material is processed through a bath containing an aqueous solution of the fluorocarbon and is cured with heat. A fire-retardant may also be applied as an additional treatment or fire-resistance may be an inherent characteristic of the fabric. The fabric material used for this first layer 11 does not necessarily have to contain spandex to have sufficient elasticity and conformity as certain knits, such as KERMEL (trade-mark) material, have been found to be quite adequate.

The second layer 12 is also composed of a thin, air- and water-vapour-permeable, stretchable fabric material; however, in this instance it is impregnated with charcoal to provide an alternate protective function. The treatment consists of dispersing finely ground activated charcoal (less than 6 microns in diameter, for example) in a bath of cross-linking acrylic latex. The fabric is passed through the bath to absorb the desired amount of charcoal and is cured under heat. The cured impregnate forms a latex "crust" on the fibres and the fabric must be expanded to break this crust. The fabric material used, therefore, must be one which will retain sufficient elasticity after the charcoal impregnation procedure described above in order to allow breakage of the charcoal crust between fibres. In this regard, it has been found that fabric materials containing some form of rubber/elastomer, such as the spandex in the form of continuous monofilaments contained in LYCRA (trade-mark), are best-suited for this particular application. Other materials which do not contain an elastomer may still be used; however, alternate methods of charcoal impregnation would have to be employed.

Once treated, the layers 11 and 12 are attached using conventional methods such as sewing, adhesive, heat welding. etc., to form the protective fabric 10. Alternately, the layers 11 and 12 may be fashioned conjointly into articles of clothing, wherein the attachment of the layers is effected only at the seams.

Although the preferred material 10 has been designed to be protective in environments where hazardous chemical agents exist, it does provide some degree of nuclear and biological protection. The material will protect against alpha and beta radiation and the thermal radiation from a nuclear explosion. Biologically, the material will act to protect the skin from some biological agents, to some degree; however, the degree to which it would protect may not be particularly extensive, but it would be better than bare skin.

Figure 2:
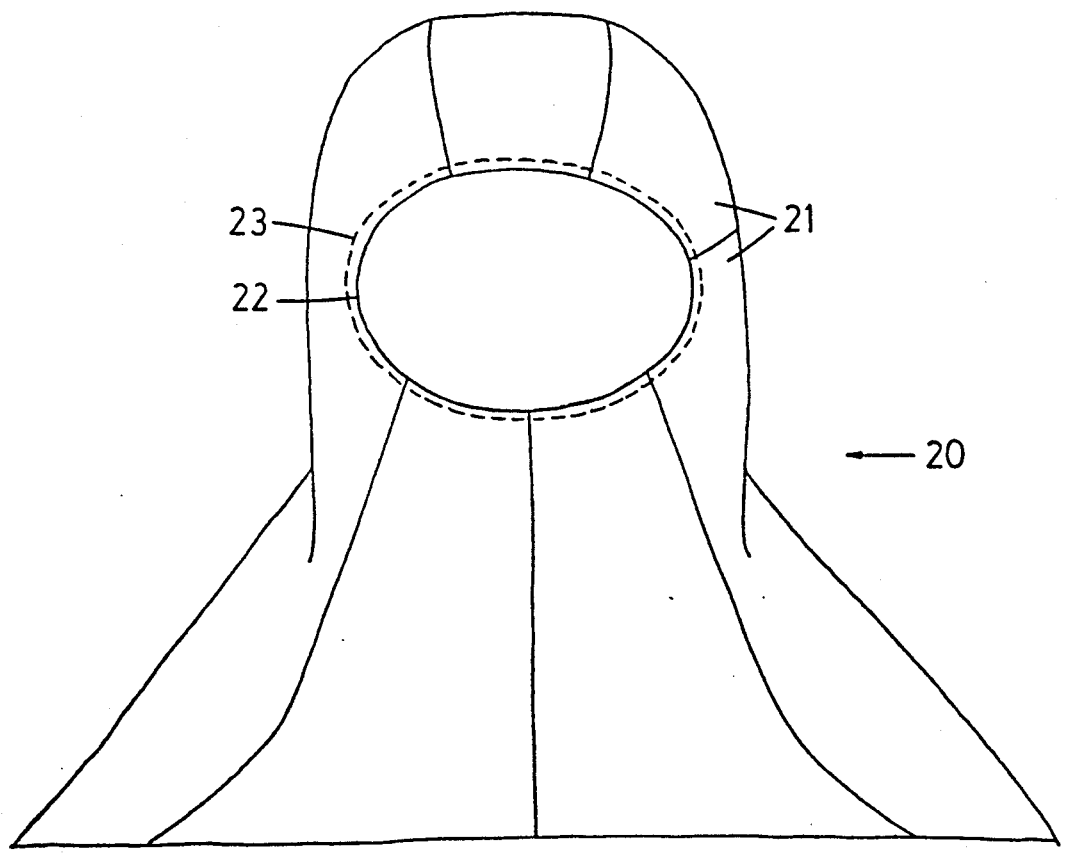
FIG. 2 is a front view of a protective hood embodying the material of the present invention.

As mentioned above, the protective fabric may be made of a plurality of layers, each being treated to provide separate protective functions or to provide protective functions in conjunction with one or more other layers. Various materials, with or without inherent protective properties, may be used and various treatments devised which result in the desired protective qualities in a stretchable protective fabric which may be made into conforming garments to meet the requirements of specific applications and/or hazardous environments. One such specific application is for personnel who require helmets or other headgear in addition to protective apparel. In this instance, a protective hood 20 (see FIG. 2) may be fashioned from the protective fabric 10. The hood 20 is made from a plurality of panels 21 of protective material 10 sewn or attached in a conventional manner. The hood 20 is designed to fit snugly and comfortably on the wearer's head under the headgear or helmet. The hood 20 is provided with an aperture 22 for the facial area and an elastic or similar tensioning means 23 is provided around aperture 22 to maintain a seal. A gas mask, which overlaps the aperture 22, is used to protect the face and respiratory tract. The material 10 of the hood is such that the earcups of the wearer's helmet effect a seal around the ears for improved hearing protection and communications intelligibility as compared with present protective hoods.

While preferred embodiments have been shown and described herein, various modifications and substitutions may be made thereto without departing from the spirit and scope of the invention as described in the following claims.

The embodiments of the invention in which an exclusive property or privilege is claimed are defined as follows:

1. A protective fabric comprising a plurality of layers of air- and water-vapor-permeable, thin, stretchable fabric material, each of said layers being treated to provide at least one protective function, comprising 1) first layer of fabric material having a durable fluorocarbon, oil-resistant and water-repellant treatment applied thereto and 2) a second layer of the fabric material having formed thereon a broken crust of dried acrylic latex having finely ground activated charcoal dispersed therein.

2. The protective fabric of claim 1, wherein at least one of said layers of fabric materials comprises spandex fibres in the form of continuous monofilaments.

3. The protective fabric of claim 1, wherein the number of layers is two.

4. The protective fabric of claim 1, wherein the first layer is further treated with a fire-retardant.

5. A protective fabric comprising first and second adjacent layers of thin, stretchable, air- and water-vapour-permeable fabric materials, the material of said first layer having a durable fluorocarbon, oil resistant and water repellant treatment applied thereto, and the material of said second layer comprising elastomeric fibres impregnated with finely ground charcoal dispersed in an acrylic latex material.

6. An article of protective apparel manufactured from the protective fabric of claim 1.

7. A method of manufacturing a protective fabric comprising the steps of: processing a first layer of thin, stretchable, air- and water-vapour-permeable material through a bath of a durable fluorocarbon, oil resistant and water repellant material; curing the processed first layer with heat; dispersing finely ground charcoal in a bath of cross-linked acrylic latex; processing a second layer of thin, stretchable, air- and water-vapour-permeable material containing elastomeric fibres through the charcoal-latex bath; curing the processed second layer and thereby forming a crust of dried latex on said fibres; stretching said cured second layer to break the latex crust; and joining said first and second layers together to form said fabric.

* * * * *